UNITED STATES PATENT OFFICE.

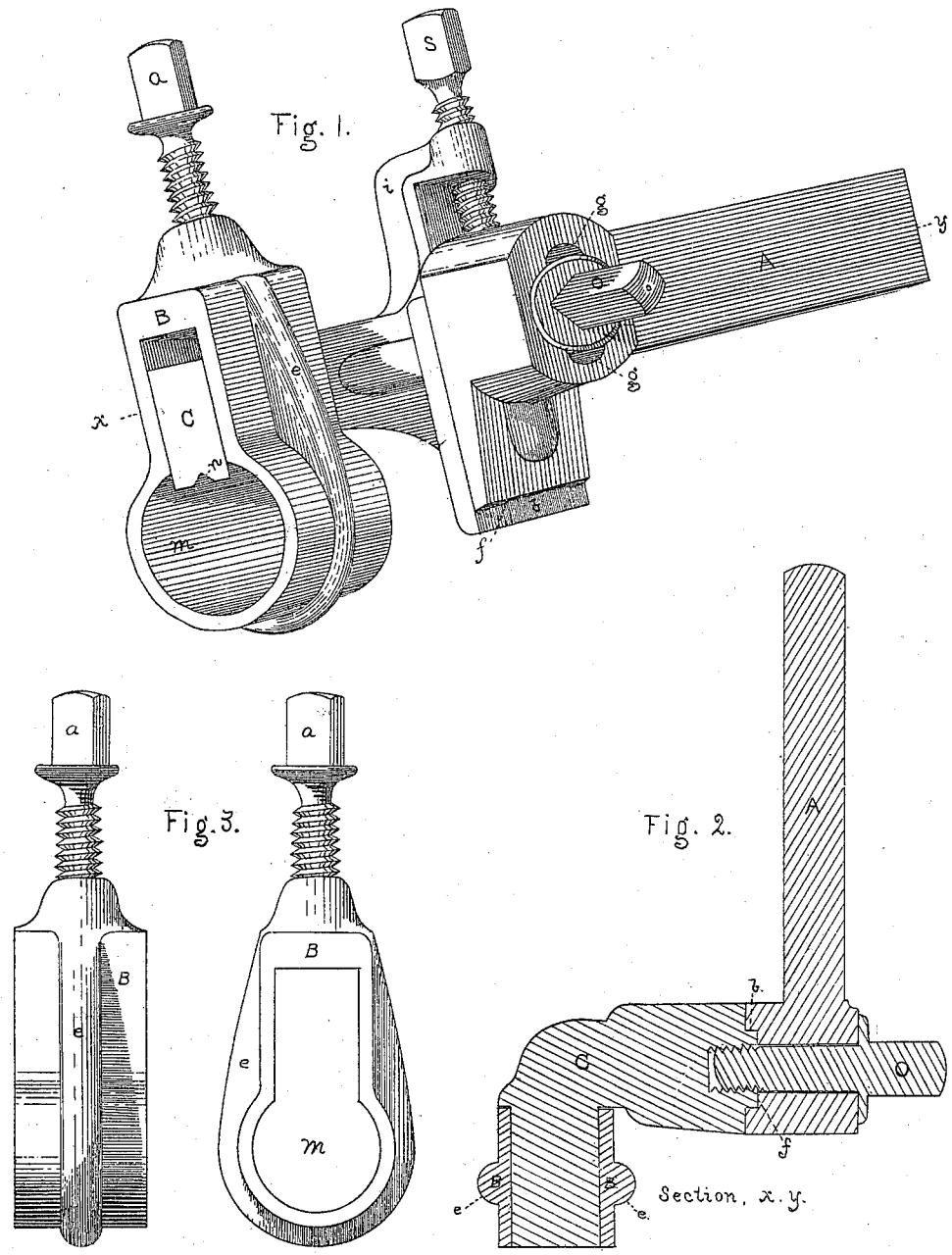

WILLIAM P. HOPKINS, OF LAWRENCE, MASSACHUSETTS.

IMPROVEMENT IN WORK-HOLDERS FOR LATHES.

Specification forming part of Letters Patent No. 134,381, dated December 31, 1872.

*To all whom it may concern:*

Be it known that I, WILLIAM P. HOPKINS, of Lawrence, in the county of Essex and State of Massachusetts, have invented a new and useful Improvement in Devices for Holding Articles to be Fluted, Grooved, or Operated upon by a Revolving Cutter in a Lathe; and I do hereby declare that the following is a full, clear, and exact description thereof, which will enable others skilled in the art to make and use the same, reference being had to the accompanying drawing forming part of this specification.

The object of this invention is to provide improved means for holding articles in a lathe while being acted upon by a revolving cutter turning upon centers. It also provides means whereby the range of application and usefulness is greatly extended beyond that of others heretofore used or known. The device is secured to the lathe-carriage tool-post in the same manner as ordinary cutting-tools usually are.

Figure 1 is a perspective view of my invention. Fig. 2 is a sectional illustration of the same, taken on the lines $x\,y$ of Fig. 1. Fig. 3 is an end and side view of the clamping-band.

Similar letters of reference mark corresponding parts.

All are made of metal.

A marks the bar of my device; B, the clamping-band; and C, the jaw. The bar A at the rear end is of the proper form to be secured in a lathe tool-post. The other end is provided with a groove, $f$, in which slides the tongue $b$ of the jaw C. This groove $f$ and tongue $b$ are in a vertical position when the device is arranged for use. The screw-bolt O passes loosely through the slot $g$ in the end of the bar A, and screws into the jaw C and holds the tongue $b$ of the jaw C in the groove $f$ of the bar A, and slides up and down with the jaw C in the slot $g$ of the bar A. The jaw C is provided with the arm $i$, which extends upward near the tongue $b$. The top of this arm $i$ is turned over the end of the bar A, and is provided with suitable internal screw-threads so as to receive the screw S, which screws down through the top of the arm $i$ upon the top of the bar A. This screw S serves to secure the jaw C at any desired elevation, or can be used to raise the jaw C when not as high as desired. The jaw C at the outer end is fitted to the band B, and is grooved at $n$ on the under side, to hold more firmly. The band B is provided with proper internal screw-threads at the top for screwing down through the tightening-screw $a$ upon the top of the jaw C, so as to draw up the lower inside end of the band B toward the under side of the jaw C, and hold firmly articles inserted between them while being acted upon by a revolving cutter turning upon the centers of the lathe. The extent of the operation is regulated by the movement of the tool-carriage of the lathe and the sliding arrangement of the jaw C upon the end of the bar A.

The lower portion of the band B is enlarged, as shown at $m$, Figs. 1 and 3, so as to permit the insertion of larger articles than would the portion sliding upon the jaw C. This enlargement $m$ is re-enforced or strengthened by the rib $e$, plainly shown in the drawing.

This form of construction combines strength, light weight, and cheapness of manufacture.

The sliding arrangement of the jaw C upon the end of the bar A may be constructed upon either side, or upon the end.

Having described my invention, I claim as new and desire to secure by Letters Patent—

1. The jaw C, provided with the arm $i$ and screw S, or not, in combination with the band B, bar A, and screw-bolt O, all constructed and arranged substantially as and for the purpose shown and described.

2. The enlargement of the lower portion of the band B, re-enforced or strengthened with the rib $e$, or not, for the purpose hereinbefore shown and described, when the band B is used in combination with the jaw C or its equivalent and the screw $a$.

WILLIAM P. HOPKINS.

Witnesses:
    BALDWIN COOLIDGE,
    GEORGE G. ADAMS.